(12) United States Patent
Woellert et al.

(10) Patent No.: US 10,974,690 B2
(45) Date of Patent: Apr. 13, 2021

(54) RATCHET ADJUSTER FOR LATCH CONNECTOR

(71) Applicant: Evenflo Company, Inc., Miamisburg, OH (US)

(72) Inventors: Thomas Woellert, Miamisburg, OH (US); Scott Miller, Miamisburg, OH (US)

(73) Assignee: Evenflo Company, Inc., Miamisburg, OH (US)

( * ) Notice: Subject to any disclaimer, the term of this patent is extended or adjusted under 35 U.S.C. 154(b) by 374 days.

(21) Appl. No.: 16/114,989

(22) Filed: Aug. 28, 2018

(65) Prior Publication Data

US 2019/0071052 A1 Mar. 7, 2019

Related U.S. Application Data

(60) Provisional application No. 62/551,990, filed on Aug. 30, 2017.

(51) Int. Cl.
| | | |
|---|---|---|
| *B60R 22/35* | (2006.01) | |
| *B60N 2/28* | (2006.01) | |
| *B60R 22/10* | (2006.01) | |
| *B60R 22/02* | (2006.01) | |

(52) U.S. Cl.
CPC ............ *B60R 22/35* (2013.01); *B60N 2/2887* (2013.01); *B60R 22/105* (2013.01); *B60R 2022/025* (2013.01)

(58) Field of Classification Search
CPC . B60R 22/35; B60R 2022/025; B60R 22/347; B60N 2002/2815; B60N 2/2887; B60P 7/083; Y10T 24/2175
See application file for complete search history.

(56) References Cited

U.S. PATENT DOCUMENTS

| | | | | |
|---|---|---|---|---|
| 4,344,588 A | * | 8/1982 | Hollowell | ........... B60R 22/3416 |
| | | | | 242/378.4 |
| 4,907,757 A | * | 3/1990 | Rumpf | ..................... B60R 22/44 |
| | | | | 242/385.4 |
| 5,779,319 A | | 7/1998 | Merrick | |
| 5,800,105 A | * | 9/1998 | Stump | ..................... B60P 7/083 |
| | | | | 242/394 |
| 6,081,976 A | | 7/2000 | Nelsen | |
| D428,806 S | | 8/2000 | Berger et al. | |
| 6,824,339 B1 | * | 11/2004 | Childers | ............... B60P 7/0846 |
| | | | | 16/110.1 |
| 6,868,585 B2 | | 3/2005 | Anthony et al. | |
| 6,962,394 B2 | | 11/2005 | Anthony et al. | |
| 7,029,068 B2 | * | 4/2006 | Yoshida | ................ B60N 2/2806 |
| | | | | 297/250.1 |
| 7,278,684 B2 | | 10/2007 | Boyle | |
| 7,338,120 B2 | | 3/2008 | Gastaldi | |
| 7,837,275 B2 | | 11/2010 | Woellert et al. | |

(Continued)

FOREIGN PATENT DOCUMENTS

| | | | | | |
|---|---|---|---|---|---|
| EP | 0560184 A1 | * | 9/1993 | ............. | B60N 2/286 |
| JP | 2004130996 A | * | 4/2004 | | |
| JP | 2018020203 A | * | 2/2018 | | |

*Primary Examiner* — Paul N Dickson
*Assistant Examiner* — Matthew D Lee
(74) *Attorney, Agent, or Firm* — BakerHostetler

(57) ABSTRACT

A connection device for connecting a child car seat to an automobile seat wherein the connection device includes a ratchet assembly for manual tightening of a webbing attached thereto.

19 Claims, 8 Drawing Sheets

(56) References Cited

U.S. PATENT DOCUMENTS

| | | | |
|---|---|---|---|
| 8,444,222 B2* | 5/2013 | Buckingham | B60N 2/2806 |
| | | | 297/253 |
| 8,950,809 B2 | 2/2015 | Szakelyhidi et al. | |
| 9,016,608 B2* | 4/2015 | Bradley | A61G 1/044 |
| | | | 242/385.2 |
| 9,120,403 B2 | 9/2015 | Hutchinson | |
| 2015/0091348 A1* | 4/2015 | Juchniewicz | B60N 2/2887 |
| | | | 297/256.16 |
| 2017/0119602 A1* | 5/2017 | Cardona | B60R 9/08 |
| 2017/0144624 A1* | 5/2017 | Geist | B60N 2/2806 |
| 2019/0366885 A1* | 12/2019 | Wilson, I | B60N 2/2806 |

* cited by examiner

RATCHET ADJUSTER FOR LATCH CONNECTOR

TECHNICAL FIELD

This invention relates to the field of child restraints for motor vehicles and to the field of devices used to attach child restraints to motor vehicles. More particularly, the present invention relates to devices for attaching child restraints via belts to lower and upper anchors provided in motor vehicles specifically provided for the purpose of securing child restraints and even more specifically, devices for tensioning such belts.

BACKGROUND

Child restraints for motor vehicles are widely used by operators of motor vehicles when traveling with children. Child restraints generally are formed from a plastic shell and may include padding and/or a harness. Child restraints are typically attached to a vehicle's seats using either the seatbelts provided on the vehicle's seats or by using an anchoring system provided specifically for use with child restraints. In the United States, most vehicles manufactured after Sep. 1, 2002, are required to include LATCH ("lower anchors and tethers for children") attachments which provide two lower anchors, one on each side of the seating position, and a tether anchor above and behind the seatback.

Many child restraints incorporating the LATCH system provide an attachment means consisting of segment of webbing that extends through a portion of the child restraint and extends beyond the seat on each side. Each end of the segment of webbing includes a clip designed to be connected to the respective lower LATCH anchor. Typically the segment of webbing also includes a buckle for shortening the overall length of the segment such that the child restraint is held tightly on the vehicle seat. While this method of attaching the child restraint may provide some advantages over securing the child restraint with the vehicle's seatbelts, it is sometimes inconvenient and difficult for the caregiver to tighten the webbing. Additionally, after the webbing is tightened, there may be a substantial tag end which may become inconvenient for other occupants of the vehicle.

Other child restraints incorporate retractor mechanisms designed to provide proper tension and to retract excess webbing between the child restraint and the LATCH anchors. For example, U.S. Pat. No. 7,837,275 assigned to the assignee of the present application, the contents of which are herein incorporated by reference, discloses a LATCH connector and portions of a tensioner that would be operable in connection with some aspects of the present disclosure. While the retractors used in these LATCH attachment mechanisms of this type have some utility, they have some disadvantages. Specifically, it sometimes may be desired to insure that the webbing is pulled as taught as possible and for a caregiver to have feedback in the form of interaction with the webbing retractor of such.

SUMMARY

According to the present invention, an attachment mechanism for LATCH belts with a belt retractor is provided having a ratchet assembly.

In a first aspect, a tensioning system for a LATCH connection assembly for a child restraint may include a connector, the connector being adapted to releasably couple to an attachment point; a retractor attached to the connector and including a spool; and a length of webbing, the length of webbing extending from the child restraint to the retractor and around the spool; and a ratcheting retractor; wherein the attachment point is provided within a passenger compartment of a vehicle and is adapted for securing a child restraint within the vehicle.

These and other features and advantages of the present invention will become apparent to those skilled in the art upon consideration of the following detailed description of preferred embodiments exemplifying the best mode of carrying out the invention as presently perceived. The drawings are only to serve for reference and illustrative purposes, and are not intended to limit the scope of the invention.

BRIEF DESCRIPTION OF THE DRAWINGS

The detailed description particularly refers to the accompanying figures in which.

DETAILED DESCRIPTION

As shown in FIGS. 1-4, an exemplary embodiment of the present invention connection/ratcheting retractor device 10 is comprised of a cover 20 containing a webbing retractor 40 therein attached to a connector 60. The cover 20 is preferably comprised of two portions that join together to form a shell.

Figure 1:
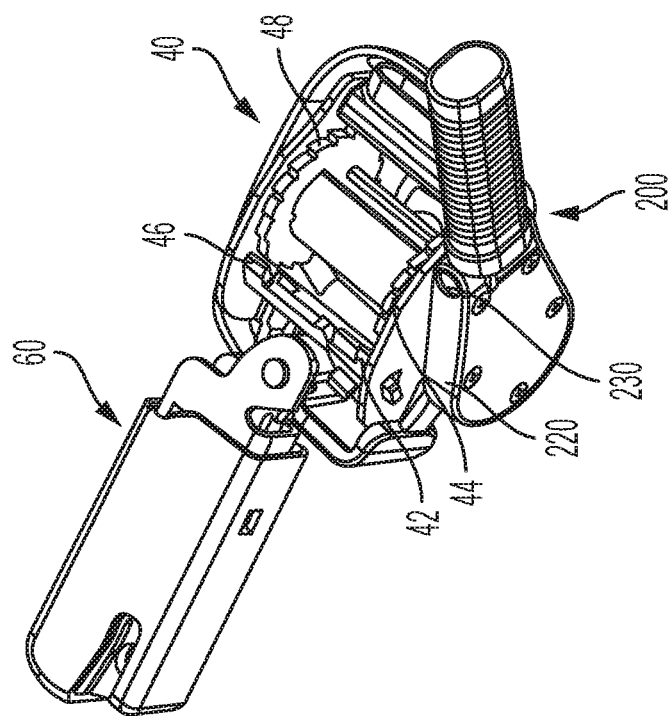
FIG. 1 is an isometric view of an exemplary embodiment of the ratcheting retractor of the present invention combined with a connector.
Figure 2:
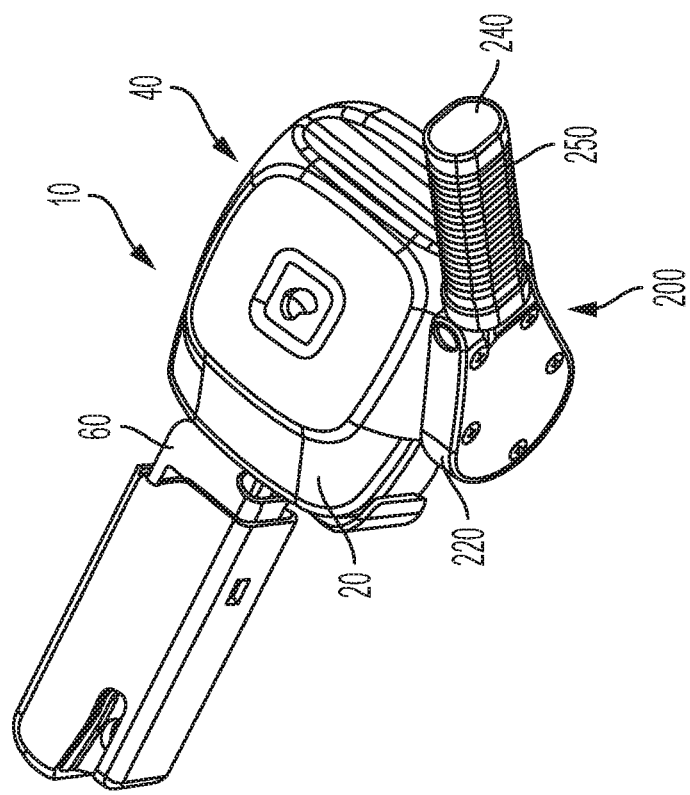
FIG. 2 is an isometric view of the retractor/connector combination of FIG. 1 with the top cover removed.
Figure 3:
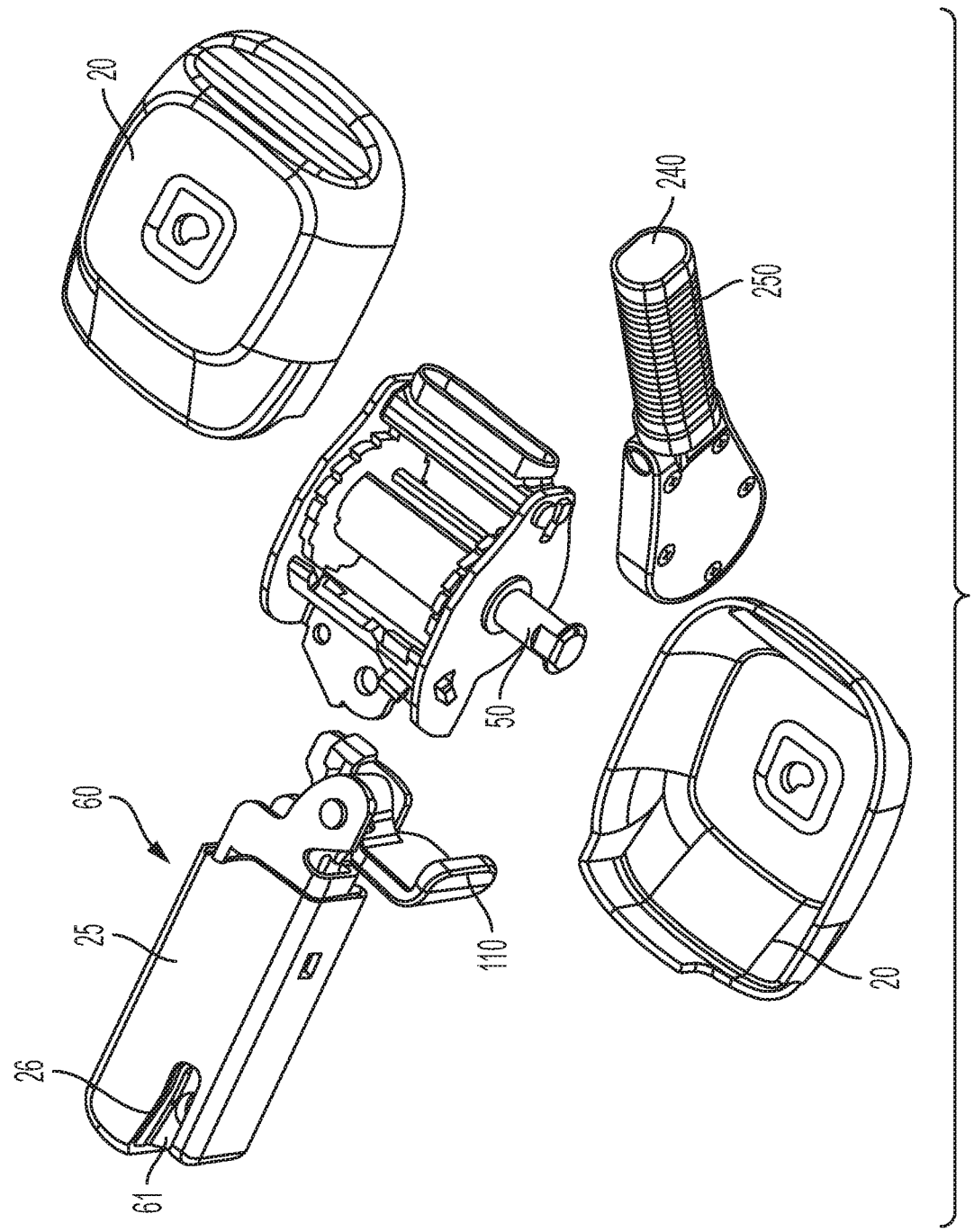
FIG. 3 is a partial exploded view of the retractor/connector combination of FIG. 1.
Figure 4:
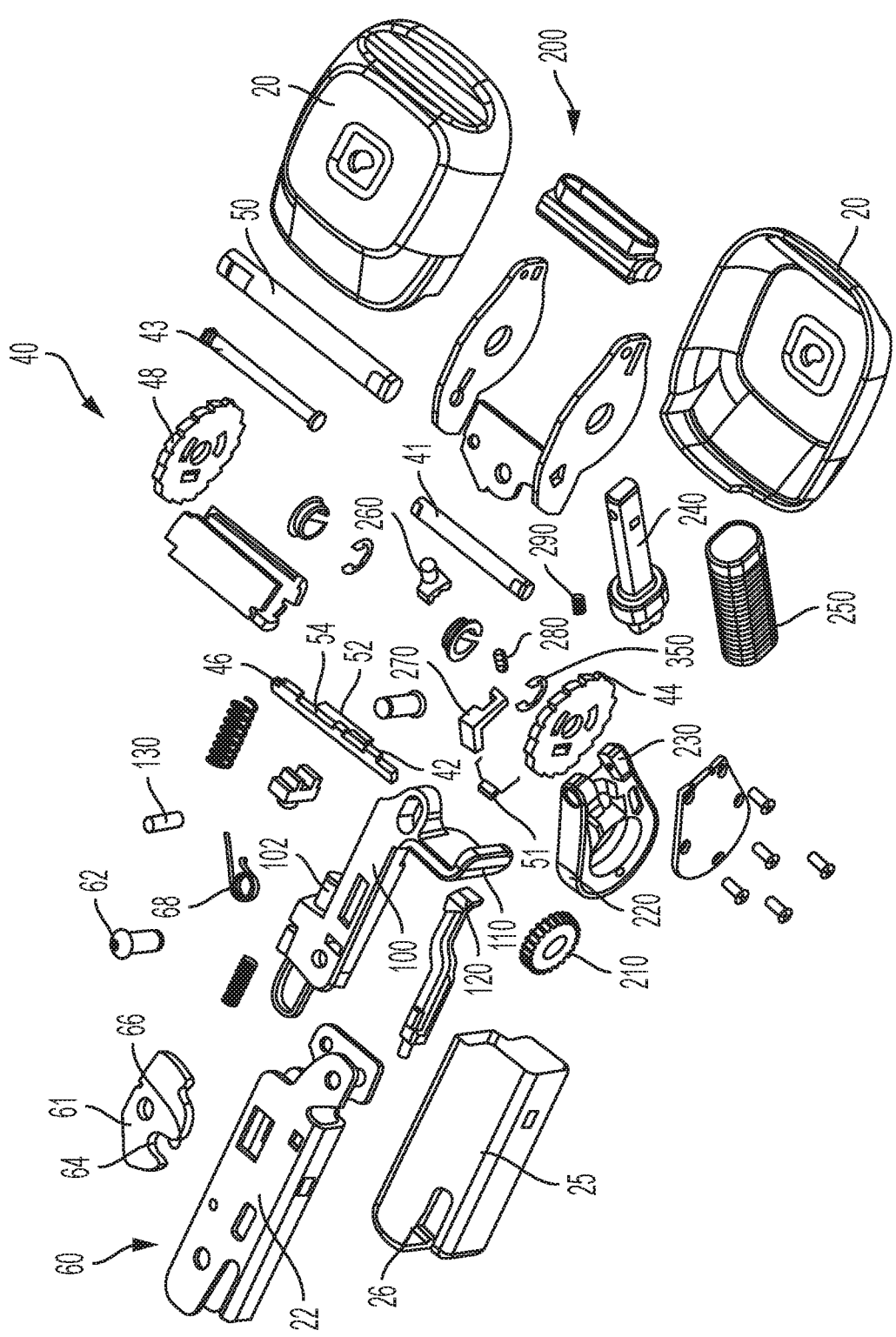
FIG. 4 is an exploded view of the retractor/connector combination of FIG. 1.

As shown best in FIG. 4, the retractor 40 preferably includes a center shaft 50 adapted to function as a spool for receiving a length of webbing. The center shaft 50 is oriented concentric and coupled to the gear wheels 44, 48 by the corresponding shaped profile of the shaft end. Spring 51 is assembled to pawl tab 52 and applies rotational force that engages pawls 42, 46 into gear wheels 44, 48 when connector 60 is locked to lower anchor.

In an exemplary embodiment, the retractor 40 has two modes: "free-wheel" mode (when the connector 60 is unlocked) and "lock" mode (when connector 60 is locked). In lock mode, pawl 42 engages gear wheel 44 and pawl 46 engages gear wheel 48. In the exemplary embodiment, pawls 42 and 46 are integrally connected via bar 54; thus, pawls 42 and 46 together may be referred to as a single pawl. However, for purposes of clarity, pawls 42 and 46 are each mentioned throughout the description of the invention herein. When engaged, the pawls 42, 46 and gear wheels 44, 48 prevent the center shaft 50 from rotating in the unwind direction, thus preventing additional webbing from being extended from the retractor 40. Even when engaged, the pawls 42, 46 and the gear wheels 44, 48 permit the center shaft to rotate in the wind direction.

Figure 5:
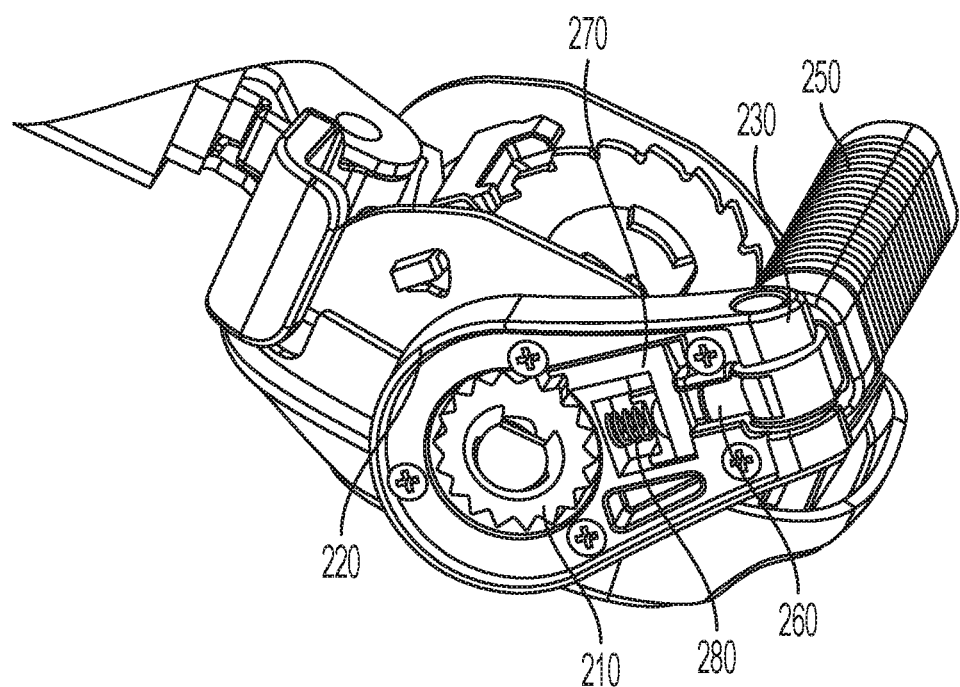
FIG. 5 is an isometric view of the retractor of FIG. 1 with portions removed
Figure 6:
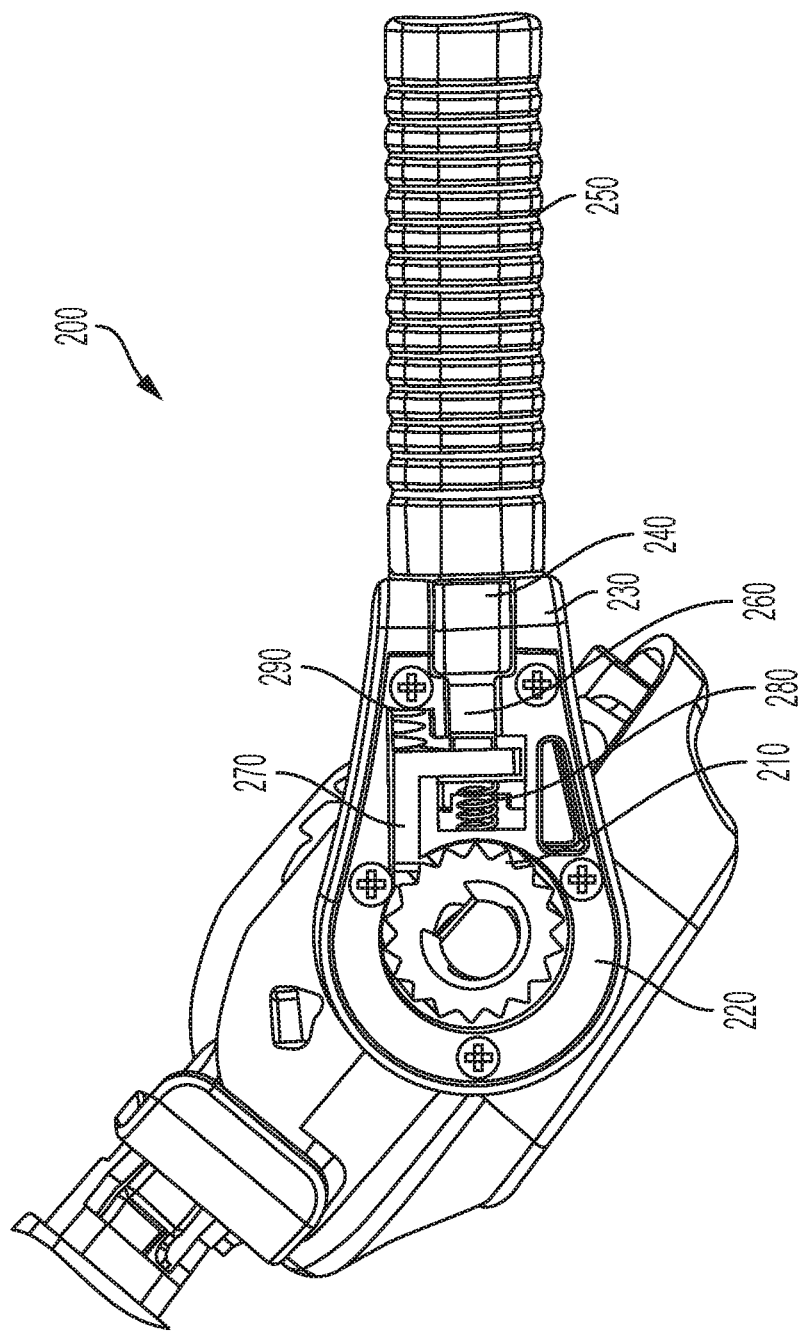
FIG. 6 is an isometric view of the retractor of FIG. 5 shown in a different position.

As shown in FIGS. 5 and 6, in a preferred embodiment, the retractor device includes a ratchet assembly 200 for securely winding the webbing utilizing the retractor 40. Specifically, as shown best in FIG. 4, the ratchet assembly 200 preferably comprises a ratchet gear 210 attached to an end of the center shaft 50 that is housed in a main housing 220. The main housing 220 preferably has a pivot 230 thereon and includes a handle 240 pivotally attached thereto, the handle 240 including a grip 250 thereon. The pivoting handle 240 can be useful for at least three reasons. First, in the unpivoted configuration, it allows for a leverage advantage in the tightening of the webbing. Second, the pivot 230 allows the handle 240 to be moved out of the way when pivoted toward the retractor 40 cover 20. Finally, in a preferred embodiment, the pivoting of the handle 240 may comprise an interlock allowing pay out of the webbing without requiring rotation of the handle 240.

Figure 7:
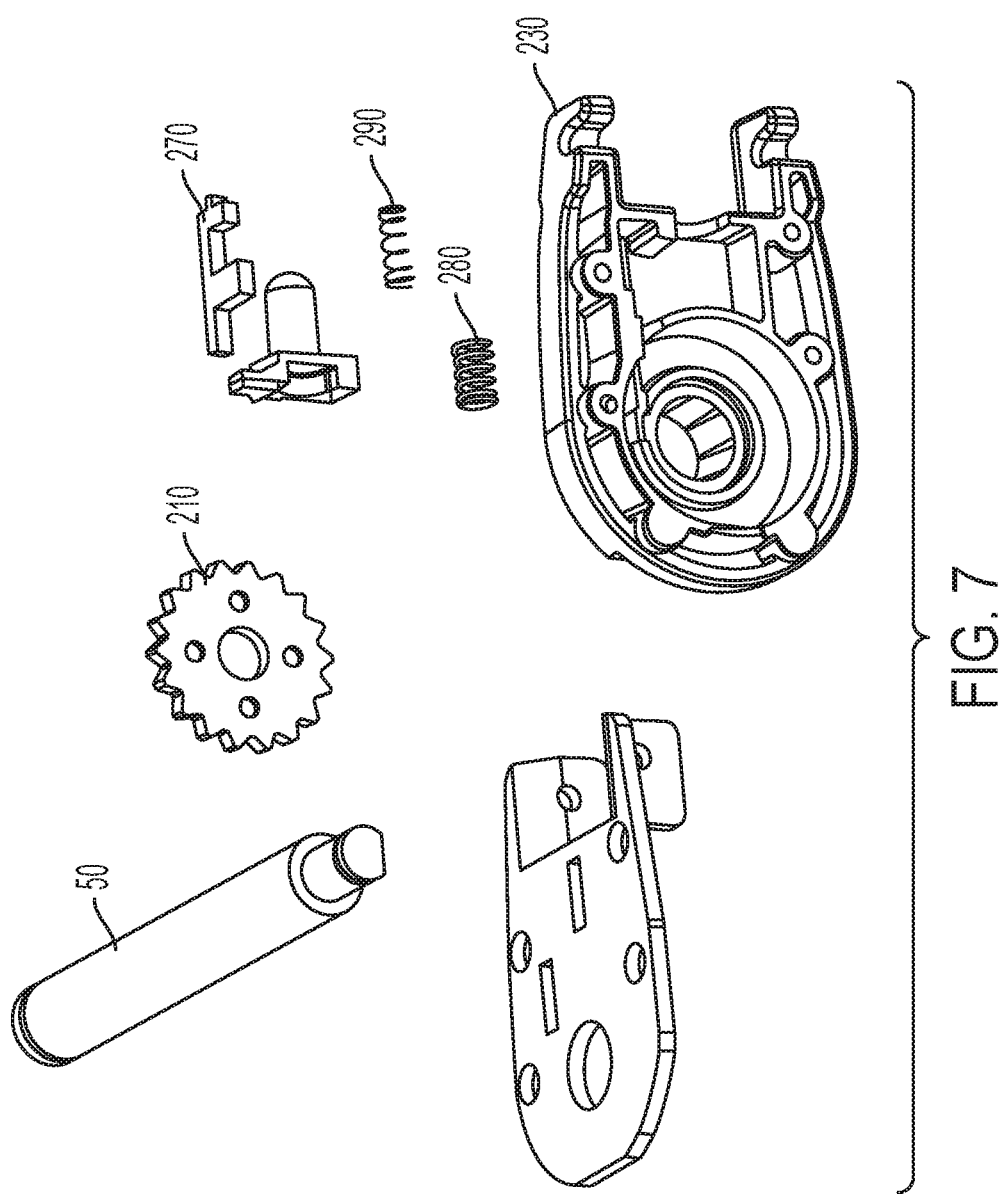
FIG. 7 is an isometric detail view of a handle free wheel interlock device for use in connection with the retractor of the present invention.

As shown in FIGS. 5-7, an embodiment is shown in which the ratchet gear 210 is directly attached to the center shaft 50 thus eliminating the need for a clutch mechanism. In this embodiment (as in others), in order to provide the interlock function, an end portion of the handle 240 is preferably formed into a plunger 260 that, when in use, cams a ratchet trigger 270 against a ratchet plunger spring 280. The ratchet trigger 270, is preferably biased in the opposite direction by a ratchet trigger spring 290, when not being cammed by the plunger 260. The folding of the handle 240 away from the cover 20 engages the plunger 260, allowing the trigger 270 to engage the ratchet gear 210. Thus when the handle 240 is straight (i.e. not pivoted), the handle 240 is connected to the center shaft 50 and rotates therewith. Conversely, when the handle 240 is pivoted, the center shaft 50 is disconnected from the center shaft 50 and does not rotate therewith. In this way, if a user desires to pay out webbing, they may do so while the handle 240 is pivoted and the handle will not rotate with the center shaft 50.

In normal operation, webbing may be wound onto the center shaft 50 by the operator rotating the handle 240 where action of the spring 51 supplies a rotational force engaging pawls 42, 46 into gear wheels 44, 48 thereby allowing only winding, but not unwinding of the webbing because the pawls 42, 46 and gear wheels 44, 48 prevent the center shaft 50 from rotating in the unwind direction. In other words, lock mode allows tightening of the webbing but does not allow loosening of the webbing. Conversely in the freewheel mode (which is triggered when the connector 60 is unlocked), pawls 42, 46 are disengaged from gear wheels 44, 48, thereby allowing the center shaft to rotate in both the unwind and wind directions. Webbing may therefore be easily extended from the retractor by the user pulling on the webbing in the free wheel mode.

Figure 8:
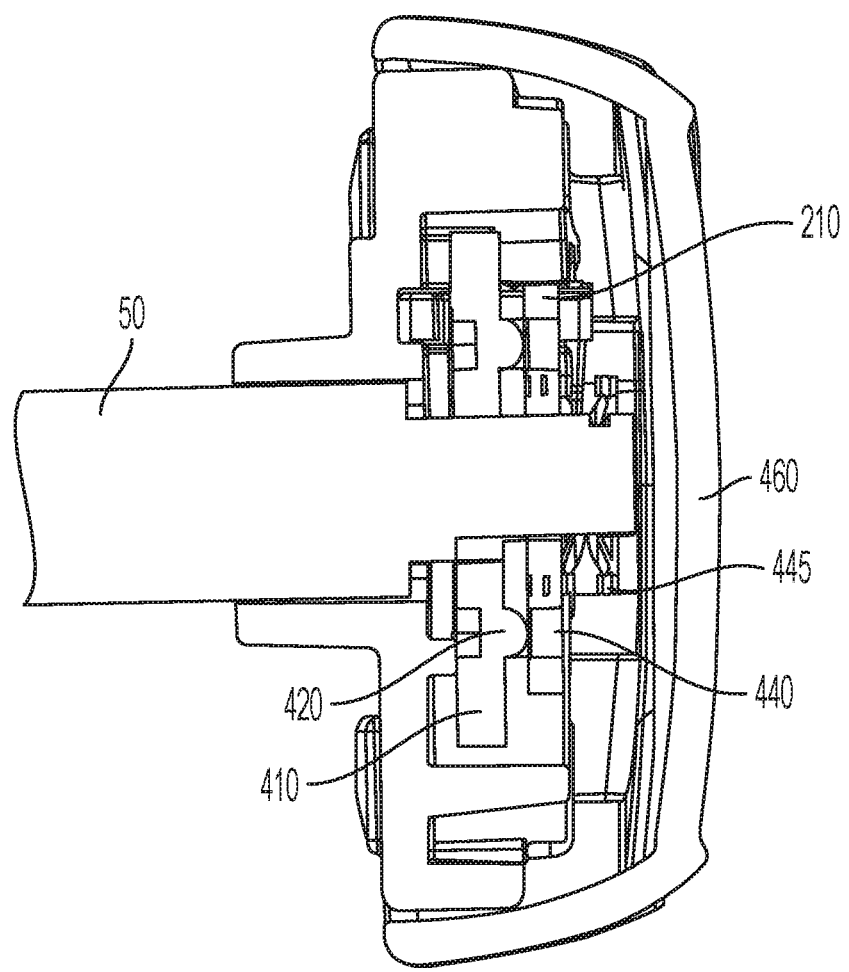
FIG. 8 is a side elevation view of a torque limiting device for use in connection with the retractor of the present invention shown in a non-engaged position.
Figure 9:
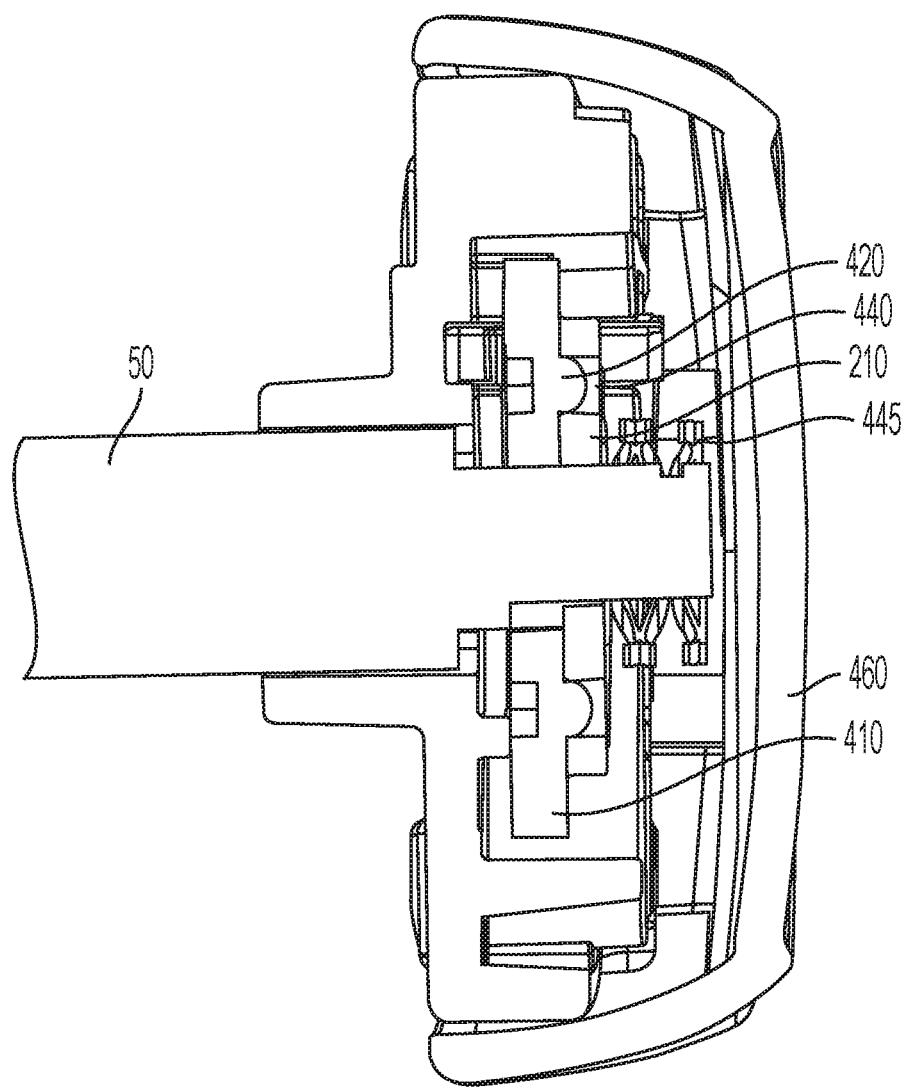
FIG. 9 is a side elevation view of the torque limiting device of FIG. 8 in an engaged position.

As shown best in FIGS. 8 and 9, in a preferred embodiment, although not required, the ratchet assembly 200 may include a clutch mechanism 400 to prevent overtightening of the webbing and/or to provide feedback to the user that sufficient tightening has been achieved. In such an embodiment, the clutch mechanism 400 may be comprised of a pressure plate 410 having nubs thereon 420 shaped to interface with corresponding indentations or holes 440 in the ratchet gear 210. Pressure to the pressure plate 410 is preferably supplied by a spring 445 which is coextensively positioned on the center shaft 50 and a cover 460 may be used to insure that the ratchet assembly 200 does not disassemble. In accordance with this embodiment, the user may rotate the handle 240 in a clockwise direction thereby tensioning the webbing. When the user achieves a predetermined webbing tension (as determined by the spring 445), the pressure plate 410 slips off the nubs and compresses the spring 445, thereby disconnecting the ratchet gear 210 from the center shaft 50 preventing the user from continuing to tighten the webbing.

As shown best in FIG. 4, in the exemplary embodiment, the webbing (not shown) runs from the center shaft 50, between pins 41, 43, and out of the retractor 40. The pins 41, 43 are preferably spaced apart by the minimum distance that permits the webbing to slide freely between them. By locating the pins 41, 43 as such, the pins 41, 43 prevent any twists in the webbing to enter the retractor. To allow this close spacing, in one way of implementing the exemplary embodiment disclosed herein, the webbing may be secured by first installing one of the pins 41, then placing the webbing over the first pin 41, and finally the second of the two pins 43 is installed. Other ways of securing the webbing would be known to those of ordinary skill in the art and are considered within the scope of the invention described herein.

In the exemplary embodiment, pawls 42, 46 are mounted to bar 54, which also includes a tab 52. Spring 56 biases bar 54 such that pawls 42, 46 are engaged with the gear wheels 44, 48 when no external forces are applied. If tab 52 is pressed towards the center shaft 50, bar 54 pivots and thereby disengages the pawls 42, 44 from the gear wheels 44, 48.

In the exemplary embodiment, latch 61 is rotatable about stud 62. Latch 61 preferably includes an opening 64 with a locking surface 66. When the latch 61 is unlocked, the opening 64 is generally aligned with the triangular opening 26 in shell 25. The connector 60 also includes a spring 68 adapted to bias latch 61 towards its unlocked position.

In an exemplary embodiment, retractor 40 and connector 60 are interlocked by segment 100. Segment 100 includes release button 110 or pull strap, interface 120, and lock pin 130. Segment 100 is spring-biased towards the rotating latch 61 on connector 60 by a helical compression spring located on nub 102 on segment 100 and nub 104 attached to the frame 22. Interface 120 is adapted to press against tab 52 when the release button 110 is depressed. Lock pin 130 is adapted to translate along the edge of latch 61. When latch 61 rotates into the locked position, the roller translates into an indentation on the edge of latch 61, thereby preventing further rotation of latch 61.

An exemplary embodiment of the connection device 10 is operated as follows. A user places the opening 64 of latch 61 over an attachment point of a vehicle. As the user slides the latch 61 over the attachment point, the attachment point pushes on locking surface 66, causing latch 61 to rotate about stud 62. The rotation of the latch 61 captures the attachment point between opening 64 and slot 24 in frame 22. (See FIG. 4.) Additionally, the rotation of latch 61 causes lock pin 130 to roll into the indentation in latch 61. Once lock pin 130 is in the indentation, the attachment point is locked into the connector 60 because the latch 61 cannot freely rotate to allow the attachment point to leave the opening 64.

As the lock pin 130 rolls into the indentation in the connector 60, the helical compression spring mounted to nubs 102, 104 moves segment 100 towards the latch 61. As segment 100 moves towards the latch 61, the interface 120 moves away from tab 52, thereby allowing spring 56 to rotate bar 54 to engage the pawls 42, 46 with the gear wheels

44, 48. Engaging the pawls 42, 46 with the gear wheels 44, 48 places the retractor in lock mode. Additionally, the release button 110 moves toward the connector 60. At this point, the connection device 10 is in lock mode: the attachment point is locked into the connector 60 and the retractor 40 is in lock mode.

To release the connection device 10, the user depresses the release button 110 or pull strap. Depressing the release button 110 or pulling the strap causes segment 100 to slide away from the latch 61, thereby moving lock pin 130 out of the indentation in latch 61. This permits spring 68 to rotate latch 61 to the unlocked position in which the attachment point can freely move out of the opening 64. Additionally, moving segment 100 away from the latch 61 causes interface 120 to press on tab 52, thereby rotating bar 54 such that pawls 42, 46 are disengaged from gear wheels 44, 48. Therefore, the retractor is placed in free-wheel mode in which tension on the webbing may be loosened manually by an operator to provide slack in the webbing when needed. Conversely, when the retractor is in locked mode, an operator may tighten the tension on the webbing using the manual ratcheting mechanism 200 as discussed above.

The connection device 10 may be used to attach a child restraint to a vehicle. In one application, the connection device 10 may be attached to one end of a length of webbing that passes through a portion of the child restraint. The other end of the webbing may be attached to a clip adapted to couple with an attachment point. To attach the child restraint to the vehicle, the user first attaches the clip to the attachment point on the vehicle adjacent to one side of the child restraint. Then the user couples the connection device 10 to the attachment point on the vehicle adjacent to the other side of the child restraint.

Once the child restraint is attached to the vehicle using one or more connection devices 10, the ratcheting operation of the retractor 40 while in lock mode permits the webbing to be tightened by operator rotating the handle 240 of the ratchet assembly 200. Thus the tension may be "ratcheted" through the resilient biasing engagement of the pawls 42, 46 to gear wheels 44, 48. Conversely, in free wheel mode, the webbing may be pulled out to provide slack to the user as desired.

The various detailed embodiments described below are to be understood in the general context of the embodiment described above. Unless otherwise specified with respect to the detailed embodiments described below, the connection devices described below are constructed and operate in the manner described above.

While each of the embodiments described above employs a particular combination of novel features, it is within the scope of the invention to provide a connection device incorporating any one or more of the above-described features, including combinations of said features not specifically described herein. While preferred embodiments of the invention have been set forth above for the purpose of disclosure, modifications of the disclosed embodiments of the invention as well as other embodiments thereof may occur to those skilled in the art. Accordingly, the appended claims are intended to cover all embodiments which do not depart from the spirit and scope of the invention.

What is claimed is:

1. A connection assembly for a child restraint seat comprising:
    a connector for releasably coupling a connection device to a vehicle attachment point;
    a retractor operably attached to the connector including a rotatable spool for paying out and retracting a webbing, the retractor including a ratchet assembly operated by a handle operably attached to the rotatable spool, the ratchet assembly including a pivot to which the handle is pivotably attached such that the handle is rotatable with respect to the retractor and is pivotable between at least (a) a generally straight, unpivoted configuration in which the handle engages a ratchet gear attached to an end of the rotatable spool, and (b) a pivoted configuration in which the handle is disconnected from engagement with the ratchet gear and is pivoted toward the retractor so as to be in at least partially overlying relationship with the rotatable spool.

2. The connection assembly of claim 1 wherein the ratchet assembly includes an interlock allowing the handle to disconnect from the rotatable spool, the interlock operated by the pivoting action of the handle.

3. The connection assembly of claim 1 wherein the ratchet assembly includes a clutch mechanism allowing the ratchet assembly to disconnect from the rotatable spool when a predetermined tension on the webbing is reached.

4. A connection assembly for facilitating securement of a child restraint seat to a vehicle comprising:
    a connector for releasably coupling a connection device to a vehicle attachment point;
    a retractor operably attached to the connector for allowing winding and unwinding of a webbing for securing a child restraint seat to a vehicle, the retractor comprising a handle operably attachable to a center shaft for winding the webbing onto the center shaft and a ratchet mechanism for allowing rotation of the center shaft in only one direction when engaged, the ratchet assembly including a pivot to which the handle is pivotably attached such that the handle is rotatable with respect to the retractor and is pivotable between at least (a) a generally straight, unpivoted configuration in which the handle engages a ratchet gear attached to an end of the center shaft, and (b) a pivoted configuration in which the handle is disconnected from engagement with the ratchet gear and is pivoted toward the retractor so as to be in at least partially overlying relationship with the center shaft.

5. The connection assembly of claim 4 wherein the ratchet gear is engaged and disengaged from the handle as the handle is pivoted between the generally straight, unpivoted configuration and the pivoted configuration.

6. The connection assembly of claim 5 wherein the handle comprises a pivot handle and a plunger on the end thereof such that pivoting of the handle from the pivoted configuration to the generally straight, unpivoted configuration causes the plunger to engage the ratchet gear.

7. The connection assembly of claim 6 further comprising a ratchet trigger positioned between the plunger and the ratchet gear, the ratchet trigger configured such that movement of the pivot handle to the generally straight, unpivoted configuration causes the plunger to cam the ratchet trigger into engagement with the ratchet gear.

8. The connection assembly of claim 4 wherein the retractor further comprises at least one pawl, the at least one pawl operably attached to an interlock such that when the interlock is engaged, the at least one pawl allows rotation of the ratchet gear in only a single direction.

9. The connection assembly of claim 4 further comprising a clutch mechanism for preventing overtightening of the webbing.

10. The connection assembly of claim 9 wherein the clutch mechanism further comprises a pressure plate having nubs thereon shaped to interface with corresponding detents in a ratchet gear of the retractor attached to an end of the center shaft.

11. The connection assembly of claim 8 wherein the interlock is operably connected to a latch portion of the connector such that when the connector is engaged with the vehicle attachment point, the interlock is engaged.

12. The connection assembly of claim 11 wherein the interlock is operably connected to a release such that when the release is engaged, the latch portion of the connector moves to a closed position preventing disengagement of the connector from the vehicle attachment point while engaging the interlock to allow movement of the center shaft in only a single direction.

13. The connection assembly of claim 11 wherein the interlock is operably connected to a release such that when the release is disengaged, the latch portion of the connector moves to an open position allowing disengagement of the connector from the vehicle attachment point and movement of the center shaft in two directions.

14. A connection assembly for facilitating securement of a child restraint seat to a vehicle comprising:
   a connector for releasably coupling a connection device to a vehicle attachment point;
   a retractor operably attached to the connector for allowing winding and unwinding of a webbing for securing a child restraint seat to a vehicle, the retractor comprising a ratchet gear attached to an end of a center shaft;
   a pivot handle operably attached to the retractor and having a plunger on an end thereof that is configured to engage and disengage the ratchet gear, the pivot handle rotatable with respect to the retractor and pivotable between at least (a) a generally straight, unpivoted configuration in which the pivot handle is connected to the center shaft and the plunger is capable of camming a ratchet trigger positioned between the plunger and the ratchet gear to engage the ratchet gear with the pivot handle such that when the pivot handle is engaged with the ratchet gear, the pivot handle may be used to wind the webbing on the center shaft, and (b) a pivoted configuration in which the handle is disconnected from the center shaft and the ratchet trigger is not engaged by the plunger or with the ratchet gear;
   a ratchet mechanism attached to the center shaft comprised of at least one pawl, the at least one pawl operably attached to an interlock such that when the interlock is engaged, the at least one pawl allows rotation of the ratchet gear in only one direction.

15. The connection assembly of claim 14 further comprising a clutch mechanism for preventing overtightening of the webbing.

16. The connection assembly of claim 15 wherein the clutch assembly further comprises a pressure plate having nubs thereon shaped to interface with corresponding detents in the ratchet gear.

17. The connection assembly of claim 14 wherein the interlock is operably connected to a latch portion of the connector such that when the connector is engaged with the vehicle attachment point, the interlock is engaged.

18. The connection assembly of claim 17 wherein the interlock is operably connected to a release such that when the release is engaged, the latch portion of the connector moves to a closed position preventing disengagement of the connector from the vehicle attachment point while engaging the interlock to allow movement of the center shaft in only a single direction.

19. The connection assembly of claim 17 wherein the interlock is operably connected to a release such that when the release is disengaged, the latch portion of the connector moves to an open position allowing disengagement of the connector from the vehicle attachment point and movement of the center shaft in two directions.

* * * * *